United States Patent [19]

Grimsley

[11] Patent Number: 4,526,297

[45] Date of Patent: Jul. 2, 1985

[54] COLLAPSIBLE LAMINATED TUBE CONTAINER AND METHOD FOR MAKING IT

[75] Inventor: Arvid K. Grimsley, Stamford, Conn.

[73] Assignee: Goodway Tools Corporation, Stamford, Conn.

[21] Appl. No.: 461,110

[22] Filed: Jan. 25, 1983

[51] Int. Cl.³ ............................................. B65D 35/08
[52] U.S. Cl. ..................................... 222/107; 222/215
[58] Field of Search ............... 222/107, 92, 94, 215, 222/206, 541; 156/466, 461, 69

[56] References Cited

U.S. PATENT DOCUMENTS

| | | | |
|---|---|---|---|
| 2,831,615 | 4/1958 | Sherbondy | 222/541 |
| 3,172,571 | 3/1965 | Marchak | 222/107 |
| 3,204,835 | 9/1965 | Michel | 222/541 |
| 3,260,411 | 7/1966 | Dobson | 222/107 |
| 3,260,777 | 7/1966 | Brandt | 264/262 |
| 3,295,725 | 1/1967 | Brandt | 222/107 |
| 3,356,263 | 12/1967 | Monroe | 222/107 |
| 3,565,293 | 2/1971 | Schultz | 222/107 |
| 4,123,312 | 10/1978 | Schmid | 156/466 |
| 4,132,331 | 1/1979 | Mägerle | 222/107 |
| 4,185,757 | 1/1980 | Schultz | 222/107 |
| 4,338,278 | 7/1982 | Schultz | 264/261 |

FOREIGN PATENT DOCUMENTS

| | | |
|---|---|---|
| 1922369 | 11/1970 | Fed. Rep. of Germany . |
| 3042073 | 7/1982 | Fed. Rep. of Germany . |
| 41-6829 | 4/1966 | Japan . |
| 1550137 | 8/1979 | United Kingdom . |

Primary Examiner—Joseph J. Rolla
Assistant Examiner—Kenneth Noland
Attorney, Agent, or Firm—Richard M. Barnes

[57] ABSTRACT

This invention relates to novel collapsible containers having laminated tubes and methods for making such containers. The containers are made from three preformed components which are designed and joined together in such a manner as to permit the economical manufacture of containers having a number of different tube diameters. The containers are characterized by soft shoulders that facilitate removal of the containers' contents. Preferred containers of the invention include tamper-proof closure members.

8 Claims, 10 Drawing Figures

COLLAPSIBLE LAMINATED TUBE CONTAINER AND METHOD FOR MAKING IT

BACKGROUND OF THE INVENTION

The present invention relates to novel collapsible containers having laminated tubes and methods for making such containers. The containers of the present invention are characterized by soft shoulders that facilitate removal of the contents of the containers and a three-piece construction that permits the economical manufacture of containers having a number of different diameters. Preferred containers of the present invention include tamper proof closure members.

Collapsible containers having laminated tubes are, of course, well known in the art. One prior art construction is described in U.S. Pat. No. 3,172,571 to Marchak. In the Marchak container, a thermoplastic headpiece is injection molded onto a laminated tube. The molded headpiece comprises a neck portion, which is threaded to receive a screw-on cap, and a skirt or shoulder portion which is bonded to the upper portion of the laminated tube during the injection molding process. Different injection molding apparatus must be constructed and used to make containers having laminated tubes of different diameters.

The laminated tube in the Marchak container may be constructed so that it is impermeable to moisture, oxygen and volatile oils. According to Marchak, the purpose of using such an impermeable tube is to prevent the passage of volatile oils and moisture from the product in the container through the tube to the exterior of the container.

A problem with the Marchak container is that the thermoplastic shoulder portion of the container, unlike the tube itself, is not laminated and is relatively permeable to moisture and oxygen. U.S. Pat. Nos. 3,260,777 and 3,295,725 to Brandt, U.S. Pat. Nos. 3,565,293, 4,185,757 and 4,338,278 to Schultz and U.S. Pat. No. 3,260,411 to Dobson all describe efforts to solve this problem. These patents describe collapsible containers having an impermeable insert embedded into or bonded to the shoulder portion of a thermoplastic headpiece. In each of the containers described in the Brandt, Schultz and Dobson patents, a thermoplastic headpiece is injection molded and simultaneously bonded to the laminated tube of the container. Accordingly, as with the Marchak container, the Brandt, Schultz and Dobson containers require the use of different injection molding apparatus to make headpieces suitable for containers having tubes of different diameters.

Beginning in the 1960's and until recently, virtually all collapsible laminated toothpaste tubes sold in the United States have been manufactured by techniques, like those described in the Marchak, Brandt, Schultz and Dobson patents, in which a thermoplastic headpiece is injection molded and simultaneously bonded to the tube portion of the container. More recently, however, tubes have been sold that are manufactured from a molded headpiece, laminated tube, and a laminated shoulder insert, all of which were pre-formed and joined together in a separate bonding step. Tubes of this type are described in West German Patentschrift DE No. 3042073 C2 (the German patent). In FIGS. 1 and 2 of the German patent, the molded headpiece is numbered 2, the laminated shoulder insert is numbered 3, and the laminated tube is numbered 1. During the bonding step, both the insert and tube are bonded to the molded headpiece. In the constructions depicted in the German patent, different headpieces must be molded for tubes of different diameters.

U.S. Pat. No. 4,132,331 to Mägerlee also describes collapsible containers in which a molded headpiece, laminated tube and a laminated shoulder insert are pre-formed and joined together in a separate bonding step or steps. I understand that the collapsible container depicted in FIG. 4 of the Mägerlee patent has been sold in Europe and possibly elsewhere. In that container, the shoulder insert, which is referred to as "connecting body 60", is inserted between the "tube pipe 2" and the shoulder portion of the "head part 62" as depicted in FIG. 4. Layers 64 and 66 of the connecting body 60 are "hot-sealing layers" so that upon the application of heat and pressure the opposite sides of these layers can be bonded to the tube pipe and shoulder portion of the head part, respectively. It is apparent from FIG. 4 of the Mägerlee patent that different "head parts" must be molded for tubes of different diameters.

In another embodiment described in the Mägerlee patent and depicted in FIG. 3 of that patent, the upper portion on of the connecting body is formed into a cylindrical neck part that is inserted into an annular groove in the head of the container. As can be seen from FIG. 3, in this embodiment both the major surfaces of the upper portion of the connecting body abut the head of the container. Inserting a connecting body into an annular groove in the head of the container would appear to present difficulties that would make the container depicted in FIG. 3 commercially impracticable.

SUMMARY OF THE INVENTION

The collapsible container of the present invention preferably is constructed from three pre-formed components, namely, a molded headpiece, a laminated shoulderpiece and a laminated tube.

The molded headpiece includes a cylindrical neck and a bonding surface. The headpiece may have a relatively short shoulder portion, but such a shoulder portion is not required. The outside surface of the shoulder portion of the headpiece may serve as the bonding surface of the headpiece. Alternatively, a bottom surface of the headpiece may serve as the bonding surface.

The laminated shoulderpiece has an inside surface and an outside surface. A portion of one of those surfaces is bonded to the bonding surface of the molded headpiece. The surface of the laminated shoulderpiece that is not bonded to the headpiece does not abut the headpiece.

When the headpiece has a shoulder portion, the inside surface of the laminated shoulderpiece may be bonded to the outside surface of the headpiece's shoulder portion. Alternatively, the outside surface of the laminated shoulderpiece may be bonded to a bottom surface of the headpiece. In this latter alternative, the shoulderpiece may extend across the cylindrical neck of the molded headpiece. The portion of the shoulderpiece extending across the cylindrical neck must be broken before any foreign material can be passed from the exterior of the container into the interior of the container via the container's cylindrical neck. Such an arrangement is useful to help insure that the contents of the container are not tampered with before use by the consumer.

The laminated tube has an inside surface and an outside surface. The upper portion of one of the surfaces of the laminated tube is bonded to one of the surfaces of the laminated shoulderpiece.

The container of the present invention may also include a cap that provides tamper-proof closure of the container before use by the consumer. The cap and a breakable section that is associated with it are molded as an integral part of the molded headpiece so that the cap is connected to the headpiece's cylindrical neck by the breakable section.

The cap comprises a cylinder with open and closed ends. Before use by the consumer, the closed end is positioned toward the end of the cap closest to the cylindrical neck of the container. Before the breakable section is broken by the consumer, the closed end and the breakable section prevent the passage of foreign material from the exterior of the container into the interior of the container via the cylindrical neck.

The cylindrical wall of the cap is designed and constructed so that after the breakable section is broken, the interior of the cylindrical wall may be fit around the exterior of the cylindrical neck of the container. Preferably, both the interior of the cylindrical wall and the exterior of the cylindrical neck contain screw threads so that the cap may be screwed on to the cylindrical neck.

One advantage of a container having the cap described above is that one less step is required to manufacture that container, namely, the manufacturer does not have to screw a cap on to the container. In addition, the cap, together with its associated breakable section, provide tamper-proof closure of the container before purchase and use by the consumer.

Another advantage of the container of the present invention is that the molded headpiece of that container can be used with laminated tubes having widely varying diameters. The reason for this is that, unlike the containers described in the patents discussed above, the molded headpiece of the container of the present invention does not depend on the size of the container's laminated tube because it is not bonded to or in abutment with that laminated tube. The fact that containers having a number of different tube diameters can be made from a single size of a molded headpiece can result in substantial savings to the manufacturer of the containers.

Yet another advantage of the container of the present invention is that the design of that container permits the use of a relatively thin impermeable shoulder as compared to the impermeable shoulders of prior art containers. As a result, the container of the present invention has a relatively soft shoulder as compared to prior art containers. This soft shoulder facilitates removal of the contents of the container.

Other advantages of the container construction of the present invention, as compared to prior art constructions, will be apparent to persons skilled in the art.

DESCRIPTION OF THE PREFERRED EMBODIMENTS

Figure 1:
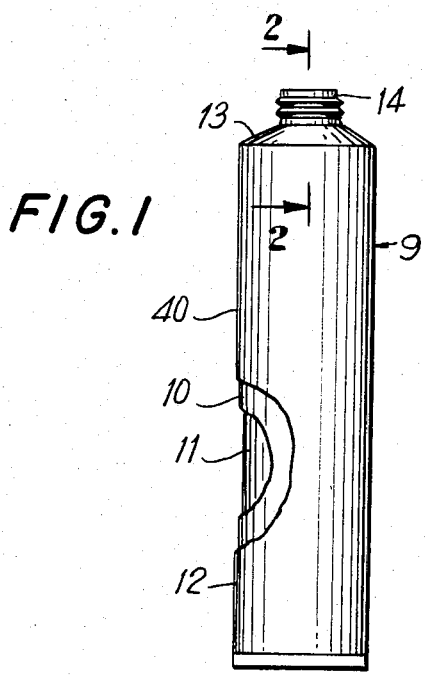
FIG. 1 shows a side view of a container of the present invention with a portion of the tube wall shown in section.

Referring to FIG. 1, there is shown a side view of one embodiment of the container of the present invention. The container 40 includes a tube 9 which, as shown in FIG. 1, comprises an outer layer 12, an inner layer 11 and a middle layer 10 sandwiched between the inner and outer layers. The middle layer 10 preferably is constructed from a material that has little or no permeation to oxygen, water vapor, and oils. For example, the middle layer may be constructed from metal foil, polyester or polyvinylidene. Preferably, the middle layer is constructed from aluminum foil. The inner and outer layers are preferably made from heat-sealable thermoplastic materials, e.g., polyethylene.

The tube 9 may be constructed from a flat laminate by techniques well known in the art. See, e.g., the technique for making tubes from flat laminates described in U.S. Pat. No. 4,123,312 to Schmid et al. The tube 9 is sealed at its bottom.

In addition to tube 9, the container shown in FIG. 1 also includes a shoulderpiece 13 and a headpiece 14. The construction of those additional components and the manner in which the components of the container are joined together are shown in more detail in FIGS. 2–4.

The shoulderpiece 13, like the tube 9, is made from a flexible laminated material comprising a middle layer 15 sandwiched between outer layer 19 and inner layer 20. The middle layer preferably is constructed from a material that has little or no permeation to oxygen, water vapor and oils and the inner and outer layers are preferably constructed from heat-sealable thermoplastic materials.

The headpiece 14 comprises a cylindrical neck 21 having screw threads 23. The headpiece also has a relatively short shoulder 22.

Figure 2:
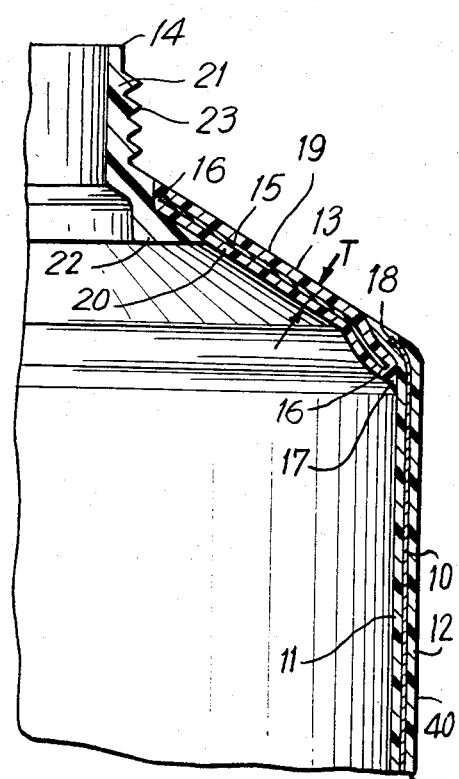
FIG. 2 shows a partial sectional view of a container of the present invention taken along the lines 2—2 in FIG. 1.

As can be seen from FIG. 2, the headpiece 14 is spaced a substantial distance from the tube 9. That distance is at least three times the thickness "T" of the shoulderpiece. Typically, that distance is at least ten times the thickness of the shoulderpiece.

In FIG. 2, as well as in FIGS. 3–9, the thickness of the shoulderpiece and tube are exaggerated relative to the diameter of the tube. Accordingly, the distance between the headpiece and tube in terms of the thickness of the shoulderpiece is greater than would appear from these figures.

The outside surface of the shoulder 22 is bonded to a portion of the inside surface of the shoulderpiece 13. As shown in FIG. 2, the upper portion of tube 9 is turned in. A portion of the outside surface of the shoulderpiece 13 is bonded to the inside surface of that turned in portion of tube 9.

Preferably, the components of the container 40 are bonded together by a heat sealing process. During heat sealing, portions of the container's thermoplastic layers may flow around the edges 16 of the middle layer 15 of shoulderpiece 13 and the upper edge 18 of the middle layer 10 of tube 9. As shown in FIG. 2, a portion of thermoplastic flowed around one of the edges of the middle layer 15 to provide a barrier 17 that protects and insulates the contents of the container from that middle layer.

The components of container 40, like the components of other embodiments of the present invention, can be brought together and heat sealed to each other by a number of different processes including the steps of: (a) placing a portion of the appropriate surface of the laminated shoulderpiece against the bonding surface of the container's headpiece; (b) heating and pressing together the portions of the shoulderpiece and the headpiece that were placed together in step (a) to bond those portions together; (c) placing a portion of the appropriate surface of the laminated shoulderpiece against the upper portion of the appropriate surface of the laminated tube; and (d) heating and pressing together the portions of the shoulderpiece and headpiece that were placed together in step (c) to bond those portions together. Preferably, the steps set forth in (b) and (d) are conducted substantially simultaneously.

Figure 3:
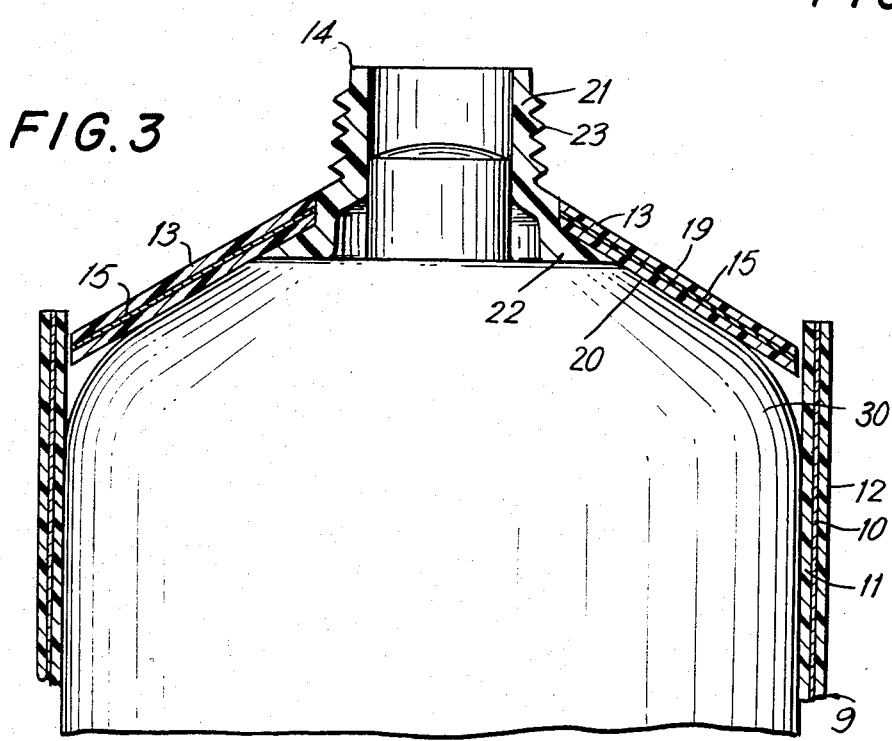
FIG. 3 shows a partial sectional view depicting one stage in a process for making the container depicted in FIG. 2.

Referring to FIG. 3, there is shown one stage in a process for making the container depicted in FIGS. 1 and 2. As shown, headpiece 14 and shoulderpiece 13 are disposed on supporting mandrel 30. Tube 9 is disposed about the supporting mandrel 30 so that a portion of the tube 9 extends above a portion of the shoulderpiece 13. The components of the container may be positioned in this manner by hand or by automatic machinery or by a combination of automatic machinery and hand. Except that the headpiece 14 must be positoned on the mandrel 30 before or concurrently with the shoulderpiece 13, the components of the container may be positioned on the mandrel in any order.

In a preferred process, the components of container 40 are positioned automatically in a series of stations. In the first station, the headpiece is positioned on a support. In the second, the laminated shoulderpiece is punched out and positioned on the support to obtain a subassembly comprising the headpiece and shoulderpiece. In the third station, the subassembly is positioned on the supporting mandrel 30. And, in the fourth station, the laminated tube is positioned on the supporting mandrel.

When the components of the container 40 are positioned as shown in FIG. 3, the bonding surfaces of those components are ready to be heated and pressed together to bond them together. This may be accomplished in any number of ways, but in the most preferred process the components are heated and pressed together by the process described below.

Figure 4:
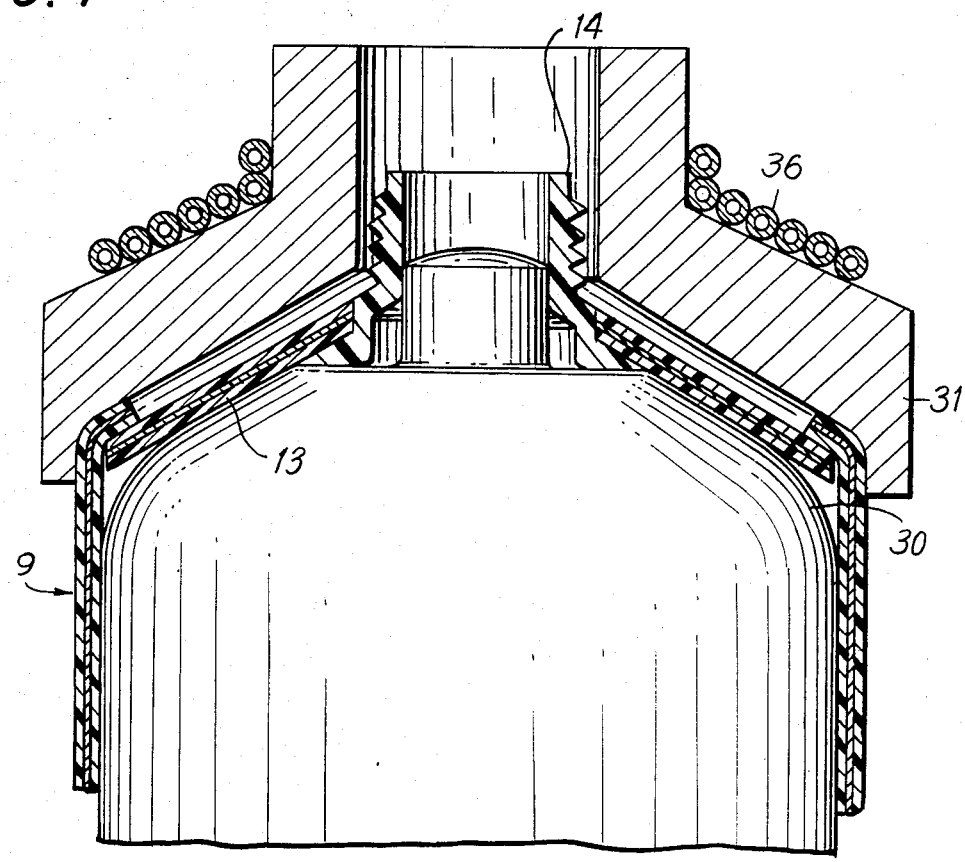
FIG. 4 shows a partial sectional view depicting another stage in a process for making the container depicted in FIG. 2.

Referring now to FIG. 4, there is shown, inter alia, a compression tool 31 for pressing the components of the container 40 together. An induction coil 36 is wrapped around the compression tool 31.

In FIG. 4, the compression tool 31 is shown in a position on its downward stroke after it has folded the upper portion of the tube 9 inwardly and just before it is about to press the components together. At or about the time that the compression tool begins to press the components together, current flow is initiated in the coil 36 to produce a high frequency magnetic field. The magnetic field is maintained at a frequency and for a time period to heat the aluminum layers in the shoulderpiece and tube (layers 15 and 10, respectively) and to cause the adjacent thermoplastic layers to soften.

After the thermoplastic layers are softened to an extent to permit heat bonding between adjacent layers, the current through the coil 36 is stopped and the container is permitted to cool. During cooling, the compression tool 31 continues to press the components of the container together and those components become heat bonded to each other. After heat bonding is achieved, the compression tool 31 is moved upwardly and the container having an open bottom is removed from the mandrel 30.

After the container is removed from the mandrel, the container's contents may be introduced into its interior through the open bottom of the container. The bottom is then sealed, e.g., by heat sealing.

Figure 5:
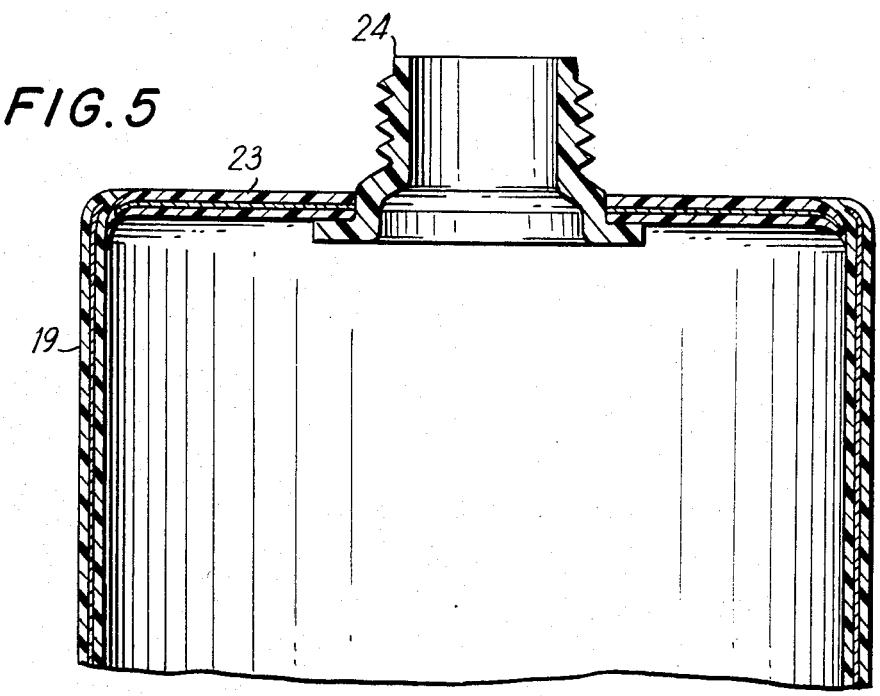
FIG. 5 shows a partial sectional view of another embodiment of a container of the present invention.

Another embodiment of the container of the present invention is depicted in FIG. 5. This embodiment includes headpiece 24, laminated shoulderpiece 23 and laminated tube 19. As can be seen from FIG. 5, the shoulderpiece 23 lies substantially in a horizontal plane. Containers of the type depicted in FIG. 5 would appear to be particularly useful for storing and dispensing of viscous foods, e.g., ketchup and mustard.

Figure 6:
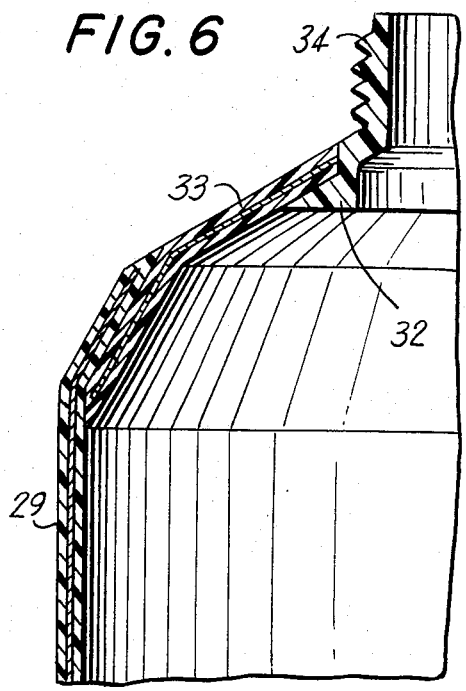
FIG. 6 shows a partial sectional view of another embodiment of a container of the present invention.

Another embodiment of the present invention is depicted in FIG. 6. This embodiment is characterized by a laminated shoulderpiece 33 that is inclined at two different angles. A portion of the inside surface of the shoulderpiece 33 is bonded to the outside surface of the shoulder 32 of the container's headpiece 34. A portion of the outside surface of the shoulderpiece 33 is bonded to the upper portion of the inside surface of the container's laminated tube 29. The container depicted in FIG. 6 may be made by a process similar to that used to make the container depicted in FIG. 2, except that during the heat bonding step the shoulderpiece is positioned on a surface of a mandrel that has a double angled surface conforming to the shape of the shoulderpiece 33.

As can be seen from FIG. 6, the portion of the shoulderpiece 33 that is bonded to the tube 29 is inclined at a greater angle from the horizontal than the portion of the shoulderpiece that is bonded to the headpiece 34. An advantage of this arrangement is that it minimizes the extent to which the tube 29 must be folded in order for it to be heat bonded to the shoulderpiece 33.

Figure 7:
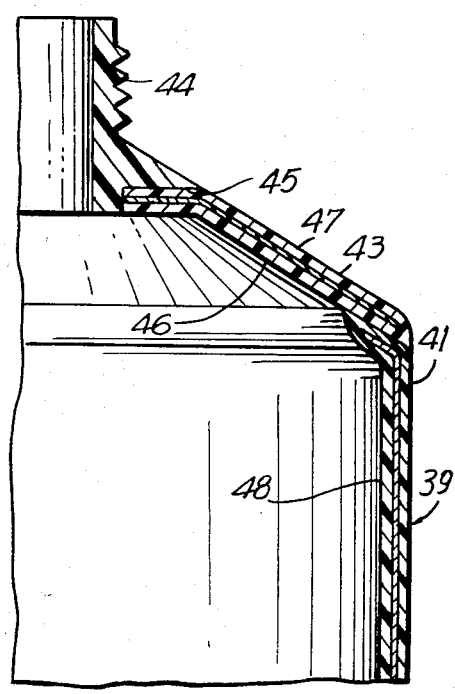
FIG. 7 shows a partial sectional view of another embodiment of a container of the present invention.

Referring now to FIG. 7, there is shown an embodiment of the container of the present invention having headpiece 44, laminated shoulderpiece 43 and laminated tube 39. In this embodiment, a bottom surface 45 of the headpiece 44 is the bonding surface of that headpiece. A portion of the upper surface of the shoulderpiece 43 is bonded to that bottom surface 45. A portion of the inner surface of the shoulderpiece is bonded to the upper portion of the outside surface of the tube 39.

The container depicted in FIG. 7 should be particularly useful when it is important that the interior of the container be entirely impermeable to the container's contents. For example, certain toothpastes include flavor-providing substances that will seep into the interior of the container during storage, if that interior is made from polyethylene. This phenomenon is particularly noticeable at the top of the container where the toothpaste lies close to the neck and upper shoulder portion of the container, resulting in an unsatisfactory "off taste" of the toothpaste first squeezed out of the container by the consumer.

A solution to this problem is to construct the interior of the container of polyester, which is virtually impermeable to such flavor-providing substances, as well as many other materials. Polyesters, however, suffer from the disadvantage that is very difficult to heat bond one polyester to another polyester. On the other hand, it is relatively easy to heat bond polyethylene to polyethylene or polyethylene to polyester.

One consequence of the difficulty of bonding polyester to polyester is that it is commercially impracticable to make the container depicted in FIG. 2 so that the entire interior of the container is constructed of impermeable polyester. The reason for this is that if headpiece 14 of the container is constructed from polyester, then it would be commercially impracticable to make the inner layer 20 of the shoulderpiece 13 out of polyester because of the difficulties of bonding such a layer against a polyester headpiece.

On the other hand, it is practicable to make the container depicted in FIG. 7 so that the entire interior of the container is made from polyester. This can be done by making the headpiece 44, the inner layer 46 of the laminated shoulderpiece 43, and the inner layer 48 of the laminated tube 39 all out of polyester. Good heat bonding between the components of the container can be achieved by making the outer layer 47 of the laminated shoulderpiece 43 and the outer layer 41 of the laminated tube 39 out of polyethylene.

Figure 8:
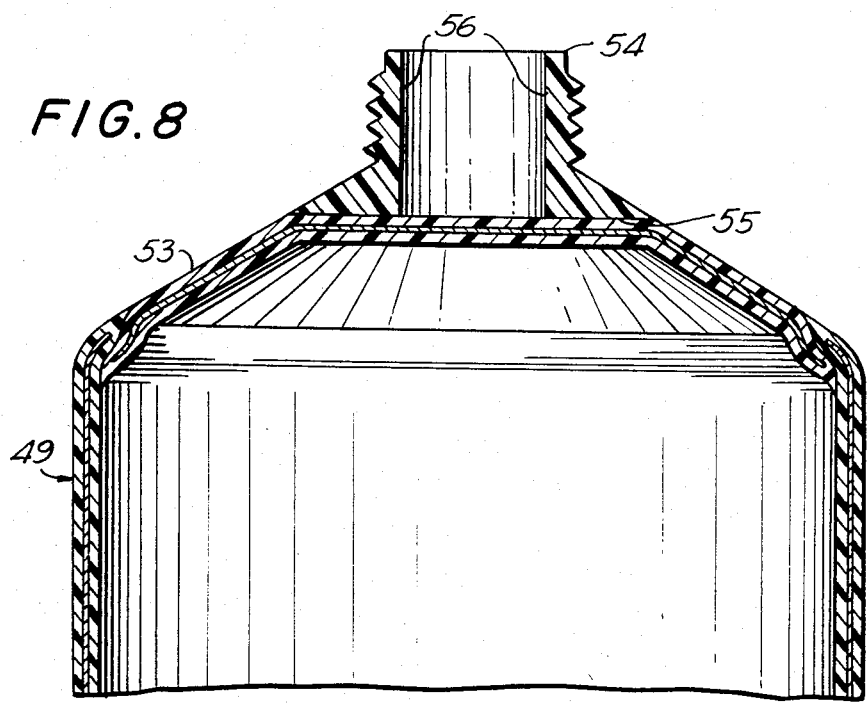
FIG. 8 shows a partial sectional view of another embodiment of a container of the present invention.

Referring now to FIG. 8, there is shown yet another embodiment of the container of the present invention. The components of this container are headpiece 54, laminated shoulderpiece 53 and laminated tube 49. As can be seen from FIG. 8, the shoulderpiece 53 is bonded to a bottom surface 55 of the headpiece 54. The container depicted in FIG. 8 is characterized by the fact that the shoulderpiece 53 extends across the cylindrical neck 56 of the headpiece. In use, this prevents any foreign material from being introduced into the interior of the container through the container's cylindrical neck until after the shoulderpiece is broken through.

Figure 9:
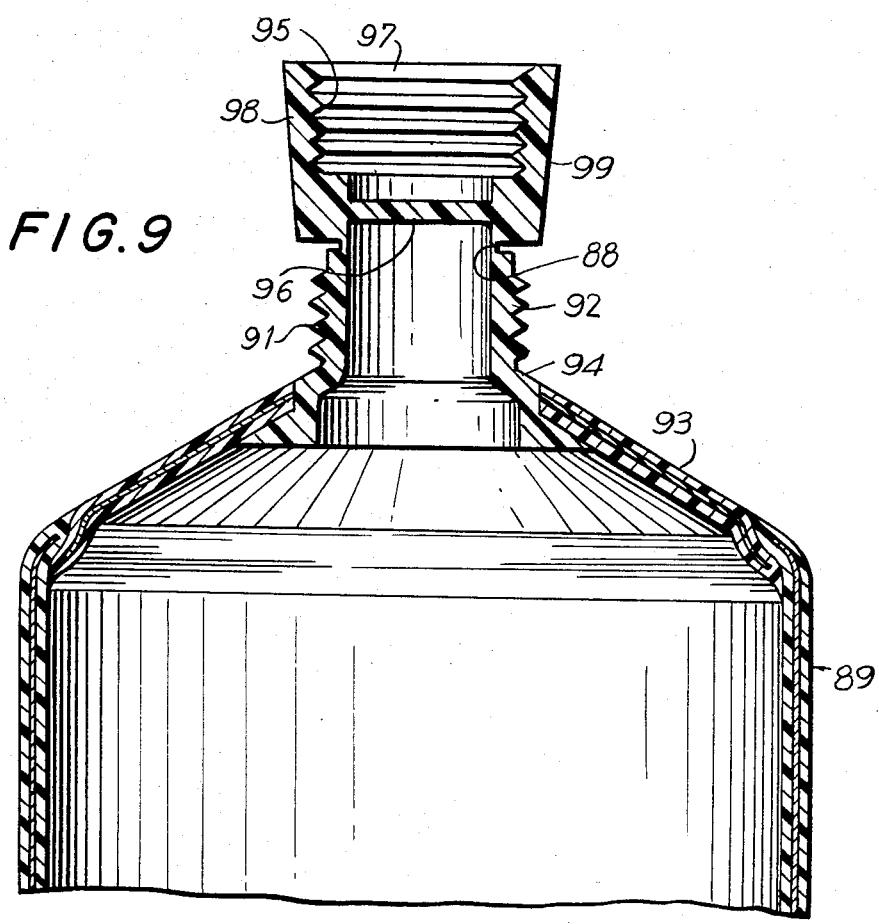
FIG. 9 shows a partial sectional view of another embodiment of a container of the present invention.

Referring now to FIG. 9, there is shown a container of the present invention having a headpiece 94, including a tamper-proof cap 99. The manner in which the container's headpiece 94, laminated shoulderpiece 93, and laminated tube 89 are oriented with respect to each other and are joined together in this embodiment is identical to how the corresponding parts were oriented and joined together in the embodiment depicted in FIG. 2.

The cap 99 comprises a cylindrical wall 98 and has an open top end 97 and a closed bottom end 96. The interior of the cylindrical wall 98 has screw threads 95. As can be seen from FIG. 9, what is referred to as cylindrical wall 98 has a slight frusto-conical shape to facilitate screwing the cap onto the cylindrical neck 92 of the container's headpiece. As used herein, the term "cylindrical wall" shall include walls having such a slight frustoconical shape.

The cap 99 is attached to the cylincrical neck 92 of the headpiece by breakable section 88. As used herein, the term "breakable section" shall mean a section connecting the cap and cylindrical neck of a container that can be readily broken by hand to separate the cap from the remainder of the container.

Before the breakable section 88 is broken by the consumer (e.g., by twisting), it together with the closed bottom end 96 of the cap function to prevent the introduction of any foreign substances into the interior of the container via the cylindrical neck. This is a highly desirable safety feature of headpiece 94. After the breakable section 88 is broken, the cap 99 may be screwed onto the cylindrical neck 92.

While the cap shown in FIG. 9 and the cylindrical neck shown in FIGS. 1-9 have screw threads, it should be understood that such screw threads are not necessary in all embodiments of the present invention. For example, the cap in some embodiments of the present invention may have a smooth internal surface which may be friction fit around a smooth external surface of the cylindrical neck of the container.

It should also be understood that the use of a safety cap like that shown in FIG. 9 is not limited to the embodiment shown in FIG. 9. That cap and its associated breakable section may be utilized with any collapsible container comprising: (a) a cylindrical neck; (b) a laminated tube; and (c) a shoulder bonded to the upper portion of the laminated tube and connecting the cylindrical neck to the laminated tube. For example, a cap of the type shown in FIG. 9 and its associated breakable section may be used in the embodiments depicted in FIGS. 5-7 of this application and in the containers described in West German Patentschrift DE No. 3042073 C2.

The cap and its associated breakable section are made as an integral part of the cylindrical neck simply by molding the cap, breakable section, and cylindrical neck (including any associated parts, e.g., a shoulder portion) in a suitable mold.

In each embodiment of the invention depicted in FIGS. 1-9, both the laminated shoulderpiece and the laminated tube comprise three layers. It should be understood, however, that the laminated components of the container of the present invention may be made from a wide range of laminates having two or more layers. It should also be understood that the laminates may comprise layers made from materials other than thermoplastics and metals. For example, a layer of printed paper may be used in the laminated tube of a container of the present invention.

Figure 10:
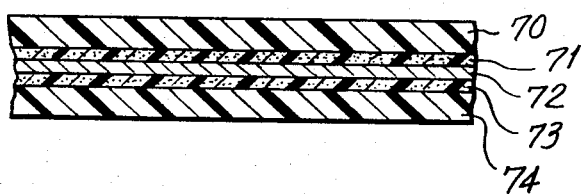
FIG. 10 shows a partial sectional view of a laminate that may be used to make tubes and shoulderpieces for a container of the present invention.

FIG. 10 shows a preferred laminate that may be used to make laminated shoulderpieces and laminated tubes for containers of the present invention. In this preferred laminate, layer 70 is made from polyethylene, layer 71 is made from ethylene acrylic acid, layer 72 is made from aluminum foil, layer 73 is made from ethylene acrylic acid and layer 74 is made from polyethylene. The ethylene acrylic acid functions as an adhesive between the aluminum foil and polyethylene layers.

What is claimed is:

1. A collapsible container comprising:
(a) a molded headpiece, said molded headpiece comprising a cylindrical neck and a bonding surface comprising a bottom surface of the molded headpiece;
(b) a laminated shoulderpiece, said laminated shoulderpiece comprising an inside surface and an outside surface, a portion of the outside surface of the laminated shoulderpiece being bonded to the bonding surface of the molded headpiece and the inside surface of the laminated shoulderpiece being positioned out of abutment with the molded headpiece;
(c) a laminated tube, said laminated tube having an inside surface and an outside surface, the upper portion of the outside surface of the laminated tube being bonded to a portion of the inside surface of the laminated shoulderpiece, said molded headpiece, laminated shoulderpiece and laminated tube being arranged and constructed so that the molded headpiece, including all its integrally molded parts, is spaced from the laminated tube by a distance at least about three times the thickness of the laminated shoulderpiece.

2. The collapsible container of claim 1 wherein the headpiece, inside surface of the shoulderpiece and the inside surface of the tube are made from a polyester.

3. The collapsible container of claim 1 wherein the shoulderpiece extends across the cylindrical neck of the molded headpiece so that foreign material cannot pass from the exterior of the container into the interior of the container via the cylindrical neck without breaking the shoulderpiece.

4. The collapsible container of claim 1 wherein the molded headpiece, including all its integrally molded parts, is spaced from the laminated tube by a distance at least about ten times the thickness of the laminated shoulderpiece.

5. The collapsible container of claim 1 further comprising:
(a) a cap, said cap comprising a cylindrical wall, a closed bottom end and an open top end, said cylindrical wall being designed and constructed so that its interior may be fit around the exterior of the cylindrical neck of the molded headpiece;
(b) a breakable section connecting and joining together the bottom end of said cap and said cylindrical neck so that the cap and breakable section prevent the passage of foreign material from the exterior of the container into the interior of the container via the cylindrical neck.

6. The collapsible container of claim 5 wherein the interior of the cylindrical wall of the cap and the exterior of the cylindrical neck both comprise screw threads which are arranged and constructed so that after said breakable section is broken the cap may be screwed onto the cylindrical neck.

7. A process for making the container of claim 1 comprising:
(a) placing a portion of the outside surface of the laminated shoulderpiece against the bonding surface of the molded headpiece;
(b) heating and pressing together the portions of the shoulderpiece and headpiece that were placed together in step (a) to bond those portions together;
(c) placing a portion of the outside surface of the laminated shoulderpiece against the upper portion of the inside surface of the laminated tube;
(d) heating and pressing together the portions of the shoulderpiece and laminated tube that were placed together in step (c) to bond those portions together.

8. The process of claim 7 wherein the steps set forth in subpart (b) and (d) are conducted substantially simultaneously.

* * * * *

UNITED STATES PATENT AND TRADEMARK OFFICE
CERTIFICATE OF CORRECTION

PATENT NO. : 4,526,297

DATED : July 2, 1985

INVENTOR(S) : Arvid K. Grimsley

It is certified that error appears in the above-identified patent and that said Letters Patent is hereby corrected as shown below:

Col. 2, Line 24, delete "on"

Signed and Sealed this

Thirteenth Day of October, 1987

Attest:

DONALD J. QUIGG

Attesting Officer

Commissioner of Patents and Trademarks